United States Patent

Nonner

(10) Patent No.: US 9,194,705 B2
(45) Date of Patent: Nov. 24, 2015

(54) METHOD FOR ROUTING IN A NETWORK, ROUTING SYSTEM, AND TRANSPORT SYSTEM

(71) Applicant: International Business Machines Corporation, Armonk, NY (US)

(72) Inventor: Tim Nonner, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 13/778,216

(22) Filed: Feb. 27, 2013

(65) Prior Publication Data

US 2013/0226446 A1    Aug. 29, 2013

(30) Foreign Application Priority Data

Feb. 28, 2012 (GB) .................................. 1203418.7

(51) Int. Cl.
*G01C 21/00* (2006.01)
*G01C 21/34* (2006.01)

(52) U.S. Cl.
CPC ............ *G01C 21/00* (2013.01); *G01C 21/3423* (2013.01)

(58) Field of Classification Search
CPC .. G01C 21/34; G01C 21/3423; G01C 21/343; G01C 21/3453
USPC ......... 701/400, 410, 420, 422, 423, 425, 467; 340/995.19
See application file for complete search history.

(56) References Cited

U.S. PATENT DOCUMENTS

| | | | |
|---|---|---|---|
| 7,957,871 B1* | 6/2011 | Echeruo | 701/54 |
| 2005/0187703 A1* | 8/2005 | Seligmann | 701/201 |
| 2010/0228574 A1* | 9/2010 | Mundinger et al. | 705/4 |
| 2010/0268447 A1* | 10/2010 | Griffiths | 701/200 |
| 2011/0112759 A1* | 5/2011 | Bast et al. | 701/202 |
| 2011/0246054 A1* | 10/2011 | Toma | 701/200 |
| 2014/0012610 A1* | 1/2014 | Francis | 705/6 |
| 2014/0163861 A1* | 6/2014 | Beaurepaire et al. | 701/400 |
| 2014/0180570 A1* | 6/2014 | Bast et al. | 701/408 |

OTHER PUBLICATIONS

Strathman et al. Automated Bus Dispatching, Operations, Control and Service Reliability: Baseline Analysis, 1998, Center for Urban Studies.*
Journal of Public Transportation, 2011, National Center for Transit Research, vol. 14, No. 3.*
Sethi, Optimal railway trip planning, 2008, University of York.*
Briggs, Optimal trip planning in transport systems with random delays, 2010, Imperial College.*

* cited by examiner

*Primary Examiner* — Thomas G Black
*Assistant Examiner* — Sara Nelson
(74) *Attorney, Agent, or Firm* — Fleit Gibbons Gutman Bongini & Bianco PL; Thomas Grzesik (57) ABSTRACT

A method for routing in a network including a plurality of nodes and links between nodes, includes the steps of: setting a start node and a destination node; for each node, assigning a waiting time distribution for at least one means of transport for at least one intermediate node between the start node and the destination node; and providing a list of alternative means of transport linking the intermediate node to a subsequent node as a function of the waiting time distribution assigned to the at least one means of transport at the intermediate node.

12 Claims, 3 Drawing Sheets

METHOD FOR ROUTING IN A NETWORK, ROUTING SYSTEM, AND TRANSPORT SYSTEM

CROSS-REFERENCE TO RELATED APPLICATION

This application claims priority under 35 U.S.C. §119 from Application No. GB1203418.7 filed Feb. 28, 2012, the entire contents of which are incorporated herein by reference.

BACKGROUND OF THE INVENTION

1. Field of the Invention

The present invention generally relates to methods for routing in a network in a transport network, a routing system, and a transport system.

2. Description of the Related Art

Networks including nodes that are connected by links or edges may represent stops or stations for public transport means, which serve the stops in terms of bus lines, for example. Usually, shortest paths are calculated and presented to a user of the system in order to proceed from a start node to destination node in a time-efficient manner.

In the past, an optimal path between such start and destination nodes was calculated based on finding a minimum cost path which specifies a sequence of links between nodes and should then be used by the user of the transport network.

Conventionally, for instance, in connection with public bus systems, predetermined fixed schedules or timetables for the buses have been considered.

Additionally, also external parameters influencing the means of transport have been taken into account. For example, U.S. Pat. No. 7,573,866 B2 discloses a method for finding optimum paths using a stochastic network model. The disclosed method aims it finding the shortest paths from a source to destination under some predetermined constraints. An imposed constraint can be a deadline, and further a stochastic influence is included by assuming randomly distributed edge lengths that correspond to costs. The method computes a path that maximizes the probability to arrive before a given deadline.

Known methods for routing in networks present a single shortest path depending on the network topology and time tables, i.e. predetermined routes of means of transport like buses and their fixed arrival and departure times at the bus stops corresponding to nodes. However, in realistic transport systems time tables are often not reliable such that fluctuations between scheduled arrivals and departures may occur. Hence, it is desirable to provide a method for routing taking into account such stochastic fluctuations of the actual transit times between nodes.

SUMMARY OF THE INVENTION

The present invention provides an improved method for routing in a network, a routing system, and an improved transport system.

The method for routing in a network according to the present invention includes a plurality of nodes and links between nodes. The method includes steps of: setting a start node and a destination node; for each node, assigning a waiting time distribution for at least one means of transport for at least one intermediate node between the start node and the destination node; and providing a list of alternative means of transport linking the intermediate node to at least one subsequent node as a function of the waiting time distribution assigned to the at least one means of transport at the intermediate node.

This invention further includes a routing system for providing a route in a network between a start node and a destination node, the network including a plurality of nodes and links between the nodes. The routing system includes a database device for storing a waiting time distribution for at least one means of transport for at least one intermediate node between the start node and the destination node; and a calculation device for calculating a list of alternative means of transport linking the intermediate node to a subsequent node as a function of the waiting time distribution assigned to the at least one means of transport at the intermediate node.

This invention still further includes a computer program product for providing a route in a network including a plurality of nodes and links between nodes. The computer program product includes a computer readable storage medium having computer readable program code embodied therein for implementing aspects of the method for routing in a network depicted above.

Certain embodiments of the presented method for routing in a network, the routing and/or transport system may include individual or combined features, method steps or aspects as mentioned above or below with respect to exemplary embodiments.

In the following, embodiments of methods and devices relating to routing in a network, the routing and/or transport system are described with reference to the enclosed drawings.

DETAILED DESCRIPTION OF THE PREFERRED EMBODIMENTS

Like or functionally like elements in the drawings have been allotted the same reference characters, if not otherwise indicated.

As mentioned above, the present invention provides an improved method for routing in a network, a routing system, and an improved transport system.

In the method for routing in a network, one may consider a link as a way to leave a given node and arrive at another node. For example two nodes can be connected via more than one link. A link can also be a sequence of sub-links that run through intermediate nodes. In connection with a bus line as a means of transport, the bus line can connect a first with a second bus stop passing at bus stops in-between. The bus line between the first and second stop may be considered a link. It is possible to assign the respective waiting distribution to specific links initiating from a node under consideration.

Aspects of the method for routing or for providing a path between a start node and a destination node for a user of the network take into account fluctuations in the actual arrival and departure times of the means of transport at the nodes. The nodes may be bus stops, train stations, taxi stands, car parks, platforms, floors, harbors, ferry or air terminals. In embodiments the means of transport are, for example, buses, trams, trains, taxis, cars, lifts or elevators, but may also include a foot walk, i.e. a distance which is linked by walking. However, one may also contemplate other means of transport and suitable stops or nodes.

Generally, the network can be a public transportation system in a city, for example, a network including buses, undergrounds, trams and other public train services. Investigations of the applicant have shown that the fixed route provided by conventional methods for routing in networks does not lead to optimal results if stochastic waiting times are involved. Instead of relying to time table data fixing the arrivals and departures of the means of transports at the nodes, embodiments of the proposed method consider waiting time distributions at the nodes or the means of transport, respectively.

For example, one can assume a passing frequency of a bus, i.e. a bus passes a node or bus stop repeatedly after an average (waiting) period. However, when a user arrives at the bus stop the offset in time is unknown.

In embodiments of the method, the method further includes, at each intermediate node, employing the means of transport corresponding to the smallest waiting time at the time of arrival at the intermediate node. As an example, a user submits a query for getting from a start node to a destination node. The user is then provided with a list of alternatives for each intermediate bus stop or node. Then, the user may take the bus or means of transport that arrives first at an intermediate node where the user should switch the means of transport for reaching the actual destination. One may call this "a greedy approach" for switching means of transport.

Embodiments of the method may further include the step: for each intermediate node, providing a list of alternative means of transport linking the intermediate node to a subsequent node as a function of the waiting time distribution. Hence, instead of generating a fixed time-table based list of connections, as for example a connecting or ongoing bus, for the user, for example, a map of the transport system is presented wherein at each node or stop one or more alternatives are presented to the user. By including alternatives the stochastic nature of the waiting time at the nodes is taken into account. The list of alternative means for each intermediate node can be limited to a predetermined number of alternatives, for example three or four alternatives.

In other embodiments of the method, the method further includes: assigning a transit time to a means of transport at a predetermined node, wherein a transit time corresponds to a transit time from the predetermined node to a subsequent node coupled to the predetermined node via a link, and determining the list of alternative means of transport further as a function of transit times assigned to the means of transport at a node. The transit times can be also taken into account for generating the list of alternatives. For example, it may be advantageous to include a certain means of transport that links a selection of nodes with a high velocity, for example an express service. Although, the express service may have a predicted waiting time distribution, for example, a very small or low departure frequency, in an overall assessment the user of such an express services may experience a time-efficient journey between the start and the destination node.

For example, a respective waiting time distribution can be determined as a function of passing frequencies of a plurality of means of transports at a node. For example, the means of transport are classified according to the lines or services, and each service has a certain frequency, i.e. they arrive at a certain frequency at the sequence of nodes although the actual arrival and departure times are unknown. One possible waiting time distribution is an exponential distribution. Generally, the waiting time distribution can be time-dependent. One can also contemplate of more sophisticated distributions.

In other embodiments of the method the list of alternative means of transport is repeatedly calculated as a function of a position, a schedule, a time table, a velocity, and/or a type of transport. For instance, the positions of the means of transports like buses, trains, undergrounds or subways can be monitored electronically by satellite-based means. Hence, the lists can be repeatedly updated when, for example, the frequency of passing at the bus stops or nodes along specific lines changes. One may contemplate of other online monitoring services of velocities of the means of transport or categorize the means of transport, for example in slow, medium and fast transport. Including such parameters in the calculation of the list of alternative means of transport may render a method for routing more efficient.

Embodiments of the method can further include: finalizing each node in a path between the destination node and the start node, wherein a path is a sequence of links, and wherein the process of finalizing a selected node includes: calculating the list of alternative means of transport for the selected node; and calculating the transit time between the selected node and the destination node, wherein links between the selected node and the destination mode are chosen such that the means of transport are employed which have the smallest waiting time at an intermediate node between the selected node and the destination node.

For example, a finalized node is a node for which a set of alternatives has already been computed. This means that the total transit time to the destination node from the selected finalized node is known. In embodiments of the method all nodes of the network are finalized. For example, the destination node has a total transit time zero.

In the routing system for providing a route in a network between a start node and a destination node, the routing system can be implemented to execute a method according to the aspects of a method for routing in a network depicted above. The routing system can be implemented as an automation system, for example, for a public transportation network. For example, the routing system can be part of a control network for the transport system.

Additionally, a transport system including a plurality of nodes, a plurality of means of transport between the nodes, the routing system as depicted above, and at least one display device for displaying the list of alternative means of transport in response to a query including the start node and the destination node can be contemplated.

For example, a user of a public transport system, which is considered representative for a network including nodes and links, may submit an inquiry for getting from the start node to the destination node. The routing system of a transport system then calculates a routing strategy for the user including a plurality of nodes, and for each node a list of alternative means of transport that the user may use. Instead of providing a single shortest path, the user may chose between alternatives. For example, the user is advised to use a first passing or arriving means of transport in the list of alternatives at a specific intermediate node where a connection of, for example, two or more lines is situated. In this greedy approach, the user can efficiently be routed from the start to the destination.

This disclosure still further provides a computer program product for providing a route in a network including a plurality of nodes and links between nodes. The computer program product includes a computer readable storage medium having computer readable program code embodied therewith for implementing aspects of the method for routing in the network described above.

The computer readable program code includes computer readable program code configured to calculate a route in a network including a plurality of nodes and links between nodes implementing the steps of: setting a start node and a destination node; for each node assigning a waiting time distribution for at least one means of transport, for at least one intermediate node between the start node and the destination node; providing a list of alternative means of transport linking the intermediate node to a subsequent node as a function of the waiting time distribution assigned to the at least one means of transport at the intermediate node.

Figure 1:
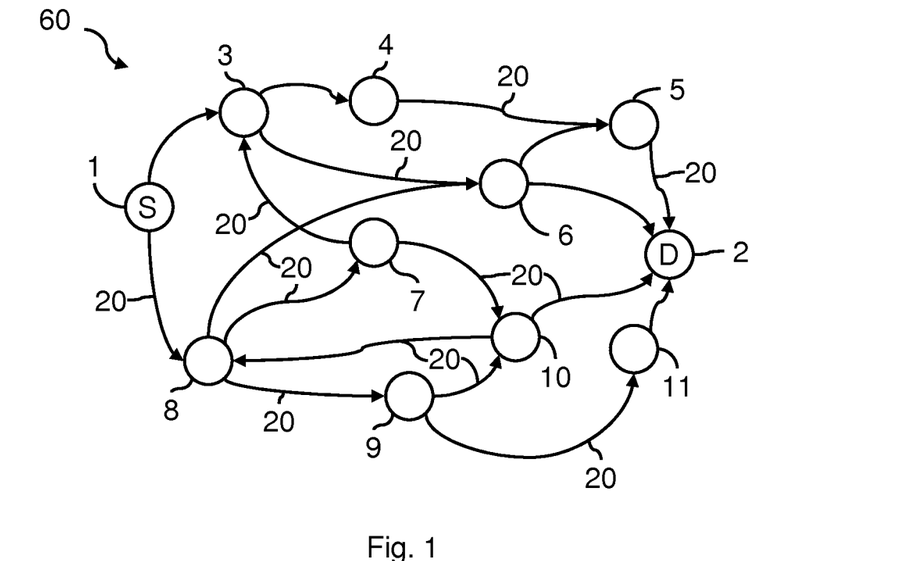
FIG. 1 shows a graph representing paths from a start to a destination node illustrating a routing process in a network.

Referring to FIG. 1, a graph representing paths from a start to a destination node in a network is shown. The network 60 includes nodes 1-11 which are coupled through links 20. A node may stand for a stop, station, terminal or the like for public transport means. The links or lines 20 coupling the nodes 1-11 are sometimes called, arcs, links, edges, paths or legs.

One may consider the links from node 8 to node 9 to node 10 and back to node 8 a circle-line bus services. The presented methods and aspects of a routing system aim at providing a user of the network an efficient way for getting from a departure or start node S 1 to a destination D 2. Instead of assuming fixed schedules for the means of public transport linking the nodes, i.e. specific times at which a means of transport arrives and departs from a selected node, stochastic or unknown waiting times are taken into account. In real world systems time tables are not always reliable. Rather in some transportation networks buses or means of transport rather pass at certain frequencies at the bus stops but not at specific times. This means that there are average waiting time distributions at each node for a specific bus line. For example, one may assume that at the departure point or starting node 1 a bus arrives every 5 or 10 minutes. This stochastic nature of arrival and departure times may render conventional approaches where a single optimum path between the start and destination node 1, 2 is provided inefficient. Instead a user getting from the start S to the destination D is presented a list of alternatives at each intermediate node wherein the alternatives are determined as a function of the stochastic waiting times at the nodes involved.

Figure 2:
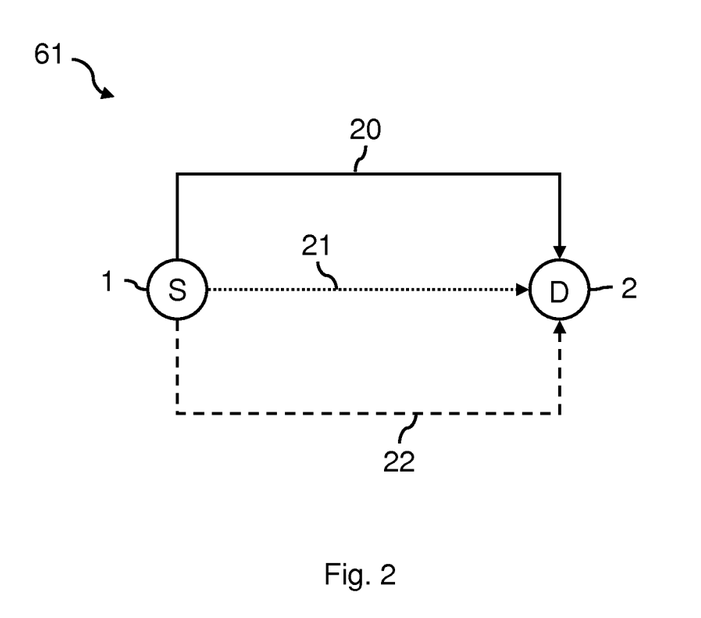
FIG. 2 shows a graph representing paths from a start to a destination node illustrating aspects a first embodiment of a routing method.

FIG. 2 shows a graph representing paths from a start to a destination node illustrating aspects of an embodiment of the routing method. In FIG. 2 the simple case of a network 61 including one start node 1 and one destination node 2 is depicted. The nodes 1, 2 are connected through links 20, 21, 22 which each correspond to a bus line. For example, the upper link 20 corresponds to bus line no. 1 having a transit or travel time between the start and destination nodes 1, 2 of 5 minutes. The dotted line 21 corresponds to a bus line no. 2 also having a transit time of 5 minutes between the start and destination 1, 2. Finally, the lower dashed line 22 represents bus line no. 3 having a transit time of 20 minutes.

According to one aspect of the routing method, waiting time distributions for the means of transport, bus lines no. 1, 2 and 3 are provided. It is assumed that bus no. 1, i.e. line 20, always departs from the start node 1 in 5 minutes, with probability 1. It is assumed that bus line no. 2, i.e. line 21, departs after 3 minutes with probability 0.5 and after 10 minutes with probability 0.5. Thus, a user of the bus service on average waits 50% of the times 3 minutes at the start node 1 for bus no. 2 and 50% of the times 10 minutes. It is also assumed that bus no. 3, i.e. line 22, always departs after 1 minute, with probability 1.

The user at the start node 1 is now presented a list of alternatives to choose from for his journey. Including only bus no. 1 as one alternative, results in an expected transit time of 5 minutes and an expected waiting time of 5 minutes. Hence, the expected total transit time is 10 minutes.

Alternatively, providing a list of alternatives including buses no. 1 and no. 2 and advising the user to take the first passing bus at the initial or start node 1, the user would board bus no. 2 with probability 0.5 after 3 minutes. This will result in a transit time of 5 minutes. Alternatively, the user boards bus no. 1 with probability 0.5 after 5 minutes also with the transit time of 5 minutes to the destination node 2. The total expected transit time is then 9 minutes. Therefore, providing alternatives at a bus stop or node in the network leads to a more time efficient routing.

In another scenario, all three buses are presented in a list of alternatives. This would result in boarding bus no. 3 always after 1 minute waiting time. Taking into account the transit time of bus no. 3 of 20 minutes, results in an expected total transit time of 21 minutes. Hence, in one embodiment of the routing method a selection of alternatives is presented to a user of the bus services traveling from the start node 1 to the destination node 2.

The examples depicted with respect to FIG. 2 leads to the conclusion that providing the user with a list alternatives of means of public transport, in the present case different bus lines, rather than presenting a single "shortest path", yields a better average total transit time, This is because the method includes stochastic aspects of the waiting times and does not rely on a specific time table.

Figure 3:
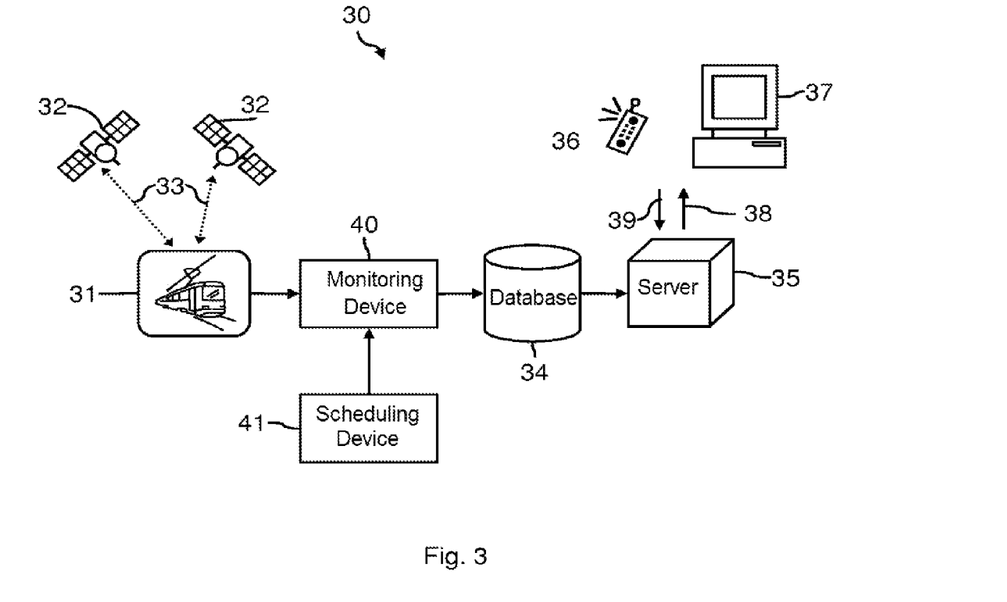
FIG. 3 shows a schematic diagram for an embodiment of a routing system.

The routing method can be implemented, for example, in terms of a routing system. FIG. 3 shows a schematic diagram for an embodiment of a routing system 30 that may implement embodiments of the proposed routing method.

In FIG. 3 a public transport network is represented by the box 31. The public transport network 31 can, for example, include buses, trains, trams and the like. One can also contemplate on more complex systems involving, for example, long distance trains, cars, taxis, airplanes, ferries or the like. The means of transport connect, for example bus stops, train stations, taxi stands, car parks, train platforms, air terminals or ferry terminals.

To improve the accuracy of the waiting time distributions, the means of transport can be monitored, for example, by satellite based systems. In FIG. 3 satellites 32 are indicated that have communication links 33 with the public transport means 31. Data required on the waiting times at the nodes or stops in the transport network are monitored by a monitoring device 40. A monitoring device 40 can also calculate for every stop, bus or train line and time the relevant waiting time distribution function. This information can be merged with time table information provided by a scheduling device 41. The monitoring device 40 provides the waiting time distributions network wide to database device 34. The database 34 is further communicatively coupled to a server device 35 that may be part of a control system for the transport network.

A user of the transportation network 31, for example, logs on to the server device 35 of the transport service provider and sends a query including the start and destination node. The user may employ for instance a personal computer 37 or a handheld device 36 having installed a suitable application.

The server device 35 carries out a routing method taking into account the waiting time distributions stored in the database device 34.

Request 39 by the user is answered by a routing policy or advice to travel within the transport network 31. Alternatively or additionally, the server device may store successful routing policies based on alternatives for each bus or train stop in order to create a heuristic method.

The result of the routing method in the routing system 30 is a list of advices for the user to take at specific stops several alternative buses or trains. The alternatives listed generally do include a selection of all possible links or means of transport at a node or bus stop.

The calculation of the list of alternatives is based on the waiting time distributions of the specific buses or lines at the bus stops.

The boxes 40 and 41 shown in FIG. 3 may relate to a device adapted to perform the specified functions. However, the boxes can also be regarded as method steps.

Figure 4:
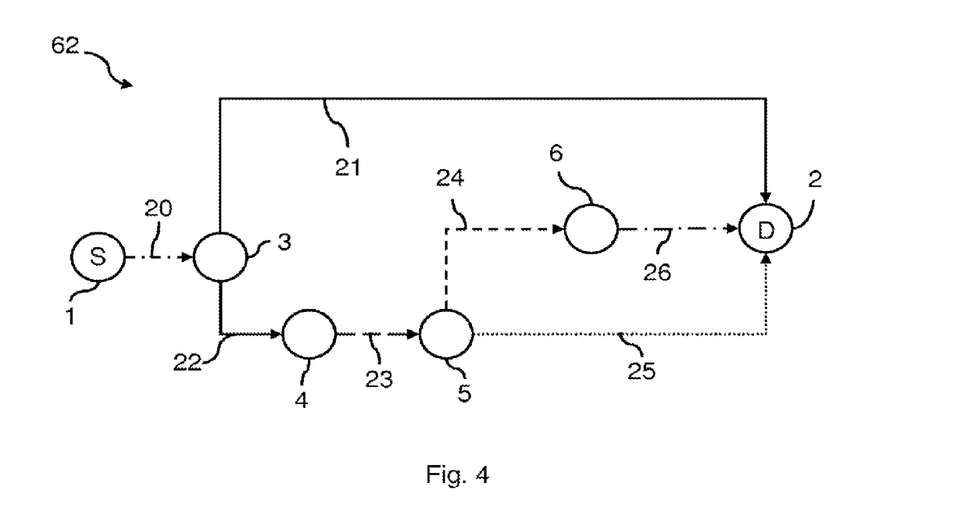
FIG. 4 shows a graph representing paths from a start to a destination node illustrating aspects a second embodiment of a routing method.

FIG. 4 shows a graph representing paths from a start to a destination node illustrating aspects of an embodiment of the routing method as for example implemented in the routing system 30. FIG. 4 shows a start node 1 and a destination node 2. There are intermediate nodes or bus stops 3, 4, 5, 6 which are connected by different bus lines. For example, the start node 1 and the intermediate node 3 are connected through one bus line 20. This is indicated by the dashed-dotted line. Intermediate node 3 and the destination node 2 are connected through a link served by bus line 21. Bus line 21 may includes sub-links, for example, when passing bus stop or node. Bus stop or node number 3 is also coupled to node number 4 by bus line 22. For example, node or bus stop 4 is coupled to bus stop 5 by a different means of transport, for example by a foot walk or passage way 23. There is a bus line 25 connecting node or bus stop 5 to the destination node 2. Further, a bus line 24 couples node or bus stop 5 with bus stop 6, and bus stop 6 is connected to the final destination 2 vie another bus line 26 (dashed-dotted line).

FIG. 4 can be considered a vivid illustration of a routing policy or the result of a query by a user. For example, aspects of embodiments of the routing methods include the advice to take either line 21 or 22 at bus stop number 5. If the user chooses the first serving bus line 21 he will arrive at the destination node without further connections. If he chooses to take bus line 22 he may be advised to get off the bus 22 at stop number 6 and walk to bus stop number 7. At bus stop number 5 the user is presented another list of alternatives, namely either choosing bus 25 or bus 24.

A selection of preferred buses or alternatives at the nodes can be extracted from the waiting time distributions stored in the data base using a heuristic approach. I.e. the selection of alternatives leading to a time efficient travel between source and destination nodes 1, 2 can be further improved.

Figure 5:
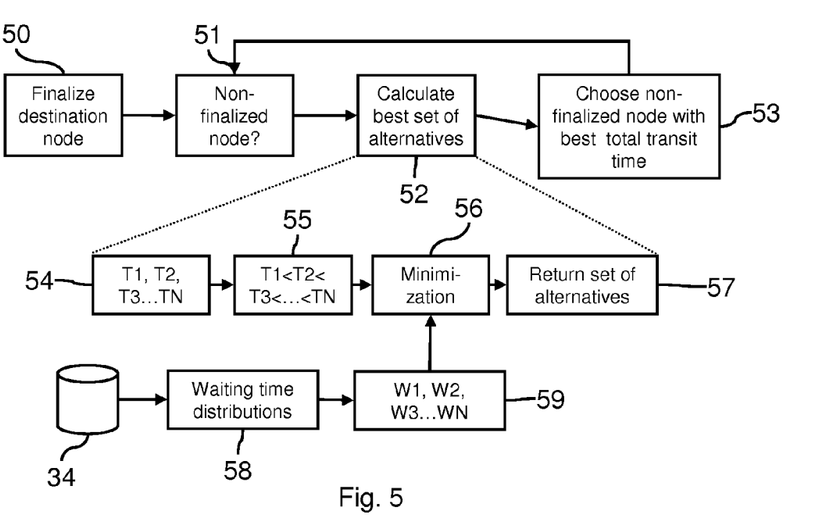
FIG. 5 shows a flow chart illustrating aspects of a third embodiment of a routing method.

FIG. 5 shows a flow chart illustrating aspects of a heuristic implementation for a routing method. In the flow chart illustrated in FIG. 5, the upper horizontal sequence of method steps 50 through 55 refers to the process of finalizing nodes in the network. A "finalized node" is a node for which a set of alternatives of means of transport has been computed. Hence, for a finalized node, the total transit time to the destination node is known under the assumption that the traveler always chooses the first passing bus or means of public transport at a node which is listed as an alternative in his route plan.

In a first step 50 the destination node is finalized. At the final or destination node the total transit time is zero. As long as there are non-finalized nodes in the network, best sets of alternatives for the nodes are calculated, and the non-finalized node with the best total transit time is selected. One focuses on the outgoing links which couple to other nodes which are already finalized. This procedure is illustrated in the loop including steps 51, 52 and 53. Hence, after finalizing the destination node in step 50 it is checked that if there are non-finalized nodes in the network in step 51. In case that there are non-finalized nodes in the network in step 52, the best set of alternatives for the non-finalized nodes are calculated. Thus, a selection of alternatives and not all possible alternatives at a specific node is decided. For example, a specific bus stop may be served by five bus lines. Instead of providing the requesting user for a route between a start and a destination node a list of all five alternatives only a subset, for example two or three alternatives are included in the list for the user's route. Next, in step 53, the non-finalized node having a set of alternatives that generate the best total transit time is chosen. This policy or routing program guarantees that the user of a network having stochastic waiting times is efficiently routed through the network from the start to the final destination.

The step of calculating the best set or subset of alternatives 52 can be implemented as illustrated with respect to process steps 54 through 59 in FIG. 5 (lower section). FIG. 5 also shows the database 34 storing the waiting time distributions for all nodes in the network under consideration. As mentioned before, the database can be repeatedly updated considering external information like position or velocity monitoring services. As example, one selected finalized node is considered in step 54. Then, the finalized neighbor nodes of this non-finalized node under consideration are examined. A neighbor is coupled to the node under consideration by the outgoing links. Generally, a neighbor can be coupled to a node also by two or more links. Let T1, T2 ... TN be the total transit times of the finalized neighbors of the selected non-finalized node. In step 55 the total transit times T1, ... TN are ordered such that T1<T2<...<TN"

In parallel or before, the waiting time distributions of the finalized neighbors are fetched from the database 34 in step 58. In step 59, W1, W2, ... WN are the respective expectation values of the waiting times of the N links coupling to neighbors.

In step 56, the expected values W1, ... WN and the transit times T1, ... TN are analyzed. In a minimization procedure the neighbor j is identified that minimizes the following expression:

$$\frac{1 + \sum_{i=1}^{j} \frac{Ti}{Wi}}{\sum_{i=1}^{j} \frac{1}{Wj}}.$$

Next, a predetermined number of alternatives are included in the list of alternatives in step 57. Specifically, the alternatives 1, 2 ... j should be included. Once there is no non-finalized node left in the network, the complete routing strategy can be presented to the requesting user. In this heuristic embodiment of the method we do not limit the number of alternatives.

One can show that the proposed embodiments of the method for routing in a network having stochastic waiting times, is in particular efficient if the waiting time distributions are exponential distributions.

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 5 may be implemented in software, as an executable program, the latter executed by suitable digital processing devices. More generally, embodiments of the present invention can be implemented wherein general-purpose digital computers, such as personal computers, workstations, etc., are used.

Figure 6:
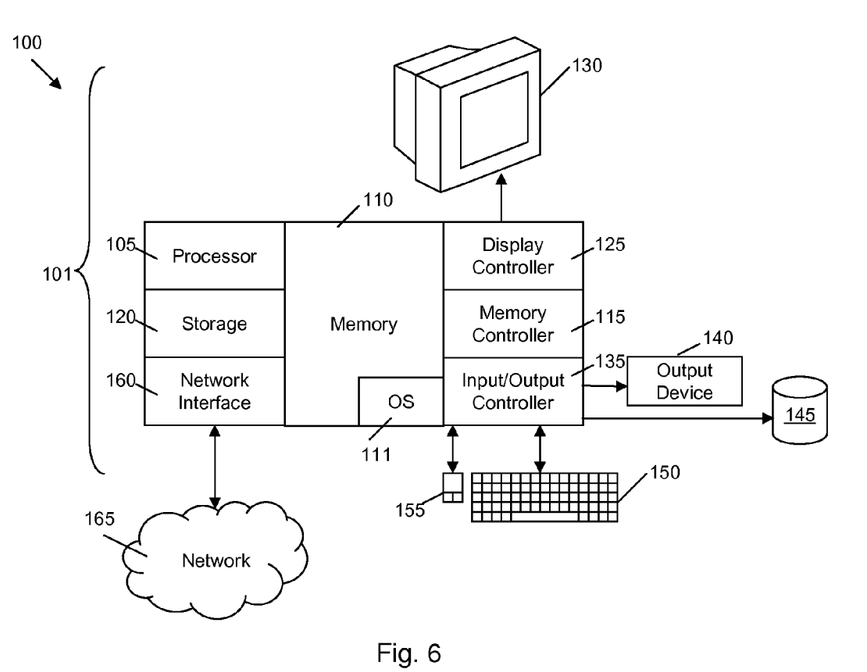
FIG. 6 shows a schematic diagram for a computerized system suitable for implementing embodiments of a routing method.

For instance, the system 100 depicted in FIG. 6 schematically represents a computerized unit 101, e.g., a general-purpose computer. In exemplary embodiments, in terms of hardware architecture, as shown in FIG. 6, the unit 101 includes a processor 105, memory 110 coupled to a memory controller 1145, and one or more input and/or output (I/O) devices 140, 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

Memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which includes an ordered listing of executable instructions for implementing logical functions. In the example of FIG. 6, the software in the memory 110 includes methods described herein in accordance with exemplary embodiments and a suitable operating system (OS) 111. The OS 111 essentially controls the execution of other computer programs, such as the methods as described herein (e.g., FIGS. 4 and 5), and provides scheduling, input-output control, file and data management, memory management, and communication control and related services. For example, the interface 1 may be embodied in the OS 111.

The methods described herein may be in the form of a source program, executable program (object code), script, or any other entity including a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 140-155 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 135 for further processing. Sensor nodes are ideally small, consume low energy, are autonomous and operate unattended.

In addition, the I/O devices 140-155 may further include devices that communicate both inputs and outputs. The system 100 can further include a display controller 125 coupled to a display 130. In exemplary embodiments, the system 100 can further include a network interface or transceiver 160 for coupling to a network 165.

The network 165 transmits and receives data between the unit 101 and external systems. The network 165 is possibly implemented in a wireless fashion, e.g., using wireless protocols and technologies, such as WiFi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 165 can also be an IP-based network for communication between the unit 101 and any external server, client and the like via a broadband connection. In exemplary embodiments, network 165 can be a managed IP network administered by a service provider. Besides, the network 165 can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein (e.g. with reference to FIG. 2, 4 or 5) are implemented in software, the methods can be stored on any computer readable medium, such as storage 120, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium, a memory, or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 101, partly thereon, partly on a unit 101 and another unit 101, similar or not.

Preferably, the present invention provides a non-transitory computer program product for providing a route in a network including a plurality of nodes and links between nodes, the computer program product including a computer readable storage medium having computer readable program code embodied therein, the computer readable program code including computer readable instructions configured to calculate a route in a network including a plurality of nodes and links between nodes according to a method including the steps of:

setting a start node and a destination node;

for each node, assigning a waiting time distribution for at least one means of transport for at least one intermediate node between the start node and the destination node; and providing a list of alternative means of transport linking the intermediate node to at least one subsequent node as a function of the waiting time distribution assigned to the at least one means of transport at the intermediate node.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

I claim:

1. A method for routing in a network including a plurality of nodes and links between the nodes, the method comprising:

setting a start node and a destination node;

identifying at least one intermediate node between the start node and the destination node;

calculating, for each of a plurality of modes of transportation, a departure probability characterizing a probability that the mode of transportation departs the at least one intermediate node after a given waiting time;

calculating a user waiting time distribution for each of the plurality of modes of transportation that service the at least one intermediate node based on the departure probability;

generating, by at least one processor of an information processing system, a list of alternative modes of transportation linking the at least one intermediate node to at least one subsequent node, the list comprising a subset of available modes of transportation servicing the at least one intermediate mode, the subset of available modes of transportation being selected for inclusion within the list based on the departure probability and the user waiting time distribution associated with each of the subset of available modes of transportation; and presenting the list to a user via an electronic display device.

2. The method of claim 1, further comprising:
at each intermediate node, employing the mode of transportation corresponding to the smallest waiting time at a time of arrival at the intermediate node.

3. The method of claim 2, further comprising:
assigning a transit time to a mode of transportation at a predetermined node, wherein a transit time corresponds to a transit time from the predetermined node to a subsequent node coupled to the predetermined node via a link; and
determining the list of alternative modes of transportation further as a function of transit times assigned to the mode of transportation.

4. The method of claim 1, wherein each of the starting node, the destination node, and the at least one intermediate node comprises one of a bus stop, a train station, a taxi stand, a car park, a platform, a floor, a harbor, a ferry or air terminal, and an airport.

5. The method of claim 1, wherein a respective user waiting time distribution is determined as a function of passing frequencies of a plurality of modes of transport at a node.

6. The method of claim 1, wherein the list of alternative modes of transportation is repeatedly calculated as a function of at least one of a position, a schedule, a velocity, and a type of transport.

7. The method of claim 1, further comprising:
finalizing each of a set of nodes including the at least one intermediate node in a path between the destination node and the start node, wherein a path is a sequence of links, and wherein finalizing each of the set of nodes comprises:
calculating the list of alternative modes of transportation for the node in the set of nodes; and
calculating a transit time between the node in the set of nodes and the destination node, wherein links between the node in the set of nodes and the destination mode are chosen such that modes of transportation are employed that have a smallest waiting time at an intermediate node between the node in the set of nodes and the destination node.

8. The method of claim 7, wherein each of the modes of transportation follows a predetermined route along a selection of nodes.

9. The method of claim 1, wherein each of the plurality of modes of transport comprises one of a bus, a tram, a train, a taxi, a car, a path, a foot walk, a lift, an elevator, an escalator, a ferry boat, and an airplane.

10. A transport system comprising:
a plurality of nodes;
a plurality of modes of transport between each of the plurality of nodes;
a routing system for providing a route in a network between a start node and a destination node, the network comprising a plurality of nodes and links between the plurality of nodes,
the routing system comprising at least one memory and at least one processor communicatively coupled to the memory, the routing system being configured to perform a method comprising setting a start node and a destination node;
identifying at least one intermediate node between the start node and the destination node;
calculating, for each of the plurality of modes of transportation, a departure probability characterizing a probability that the mode of transportation departs the at least one intermediate node after a given waiting time;
calculating a user waiting time distribution for each of the plurality of modes of transportation that service the at least one intermediate node based on the departure probability;
generating, by at least one processor of an information processing system, a list of alternative modes of transportation linking the at least one intermediate node to at least one subsequent node, the list comprising a subset of available modes of transportation servicing the at least one intermediate mode, the subset of available modes of transportation being selected for inclusion within the list based on the departure probability and the user waiting time distribution associated with each of the subset of available modes of transportation; and
presenting the list to a user via a display device.

11. A routing system for providing a route in a network between a start node and a destination node, the network including a plurality of nodes and links between nodes, the system comprising:
at least one memory; and
at least one processor communicatively coupled to the memory, the at least one processor configured to perform a method comprising:
setting a start node and a destination node;
identifying at least one intermediate node between the start node and the destination node;
calculating, for each of a plurality of modes of transportation, a departure probability characterizing a probability that the mode of transportation departs the at least one intermediate node after a given waiting time;
calculating a user waiting time distribution for each of the plurality of modes of transportation that service the at least one intermediate node based on the departure probability;
generating, by at least one processor of an information processing system, a list of alternative modes of transportation linking the at least one intermediate node to at least one subsequent node, the list comprising a subset of available modes of transportation servicing the at least one intermediate mode, the subset of available modes of transportation being selected for inclusion within the list based on the departure probability and the user waiting time distribution associated with each of the subset of available modes of transportation; and
presenting the list to a user via a display device.

12. A non-transitory computer program product for providing a route in a network including a plurality of nodes and links between nodes, the computer program product comprising a computer readable storage medium having computer readable program code embodied therein, the computer readable program code comprising computer readable instructions configured to calculate a route in a network including a plurality of nodes and links between nodes according to a method comprising:
setting a start node and a destination node;
identifying at least one intermediate node between the start node and the destination node;

calculating, for each of a plurality of modes of transportation, a departure probability characterizing a probability that the mode of transportation departs the at least one intermediate node after a given waiting time;

calculating a user waiting time distribution for each of the plurality of modes of transportation that service the at least one intermediate node based on the departure probability;

generating, by at least one processor of an information processing system, a list of alternative modes of transportation linking the at least one intermediate node to at least one subsequent node, the list comprising a subset of available modes of transportation servicing the at least one intermediate mode, the subset of available modes of transportation being selected for inclusion within the list based on the departure probability and the user waiting time distribution associated with each of the subset of available modes of transportation; and presenting the list to a user via a display device.

* * * * *